July 14, 1964 D. A. FLETCHER 3,140,827
ROTARY SPRINKLER AND TRAILER TYPE VEHICLE THEREFOR
Filed March 5, 1963 4 Sheets-Sheet 1

Donald A. Fletcher
INVENTOR.

BY Clarence A. O'Brien
and Harvey B. Jackson
Attorneys

July 14, 1964 D. A. FLETCHER 3,140,827
ROTARY SPRINKLER AND TRAILER TYPE VEHICLE THEREFOR
Filed March 5, 1963 4 Sheets-Sheet 2

Donald A. Fletcher
INVENTOR.

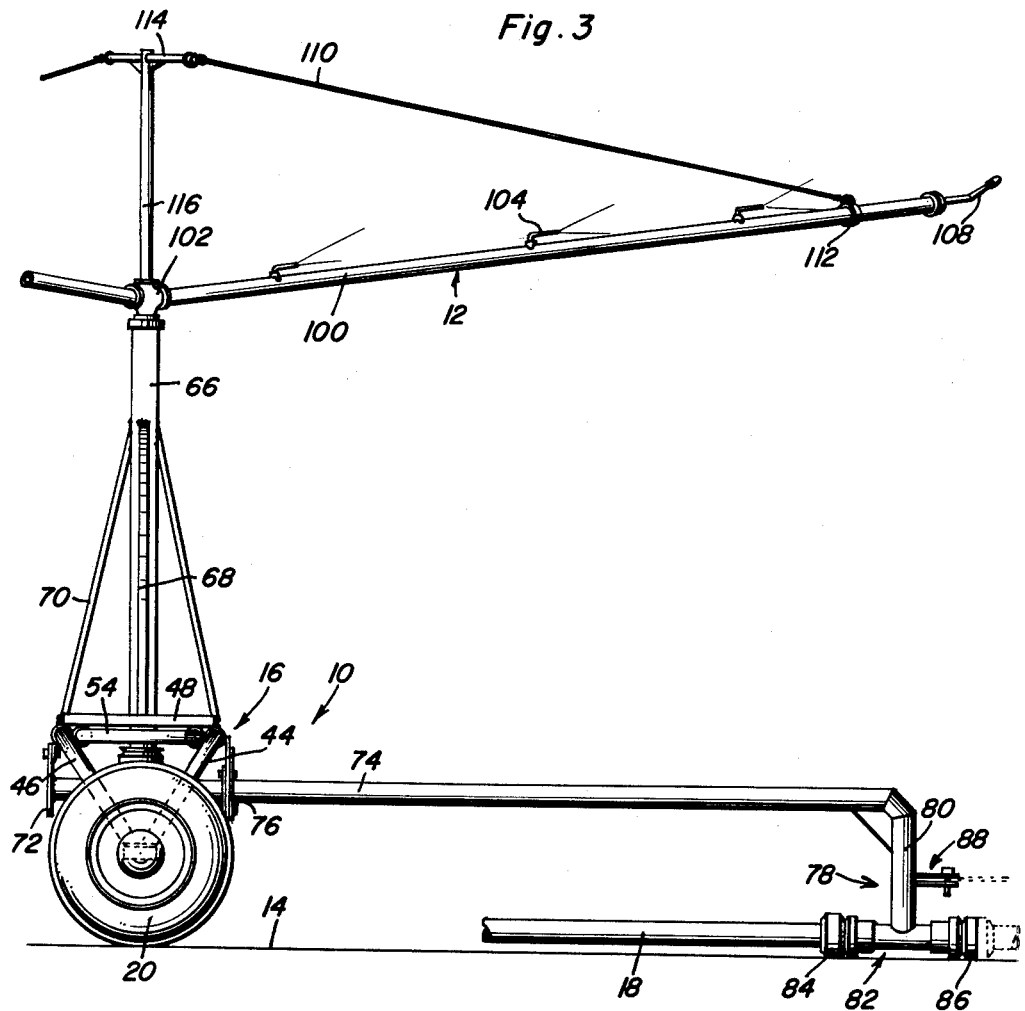

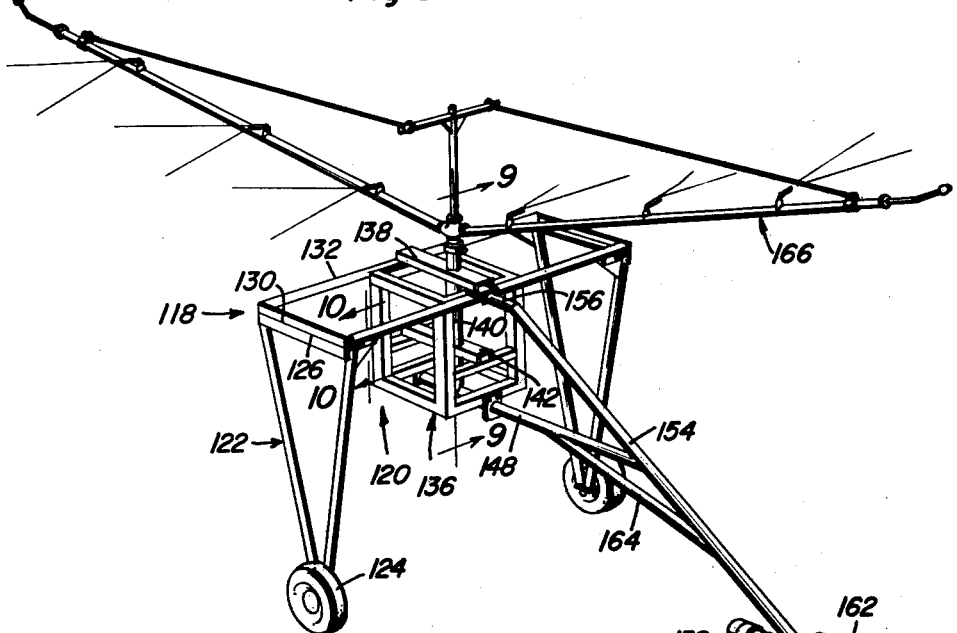

United States Patent Office 3,140,827
Patented July 14, 1964

3,140,827
ROTARY SPRINKLER AND TRAILER TYPE
VEHICLE THEREFOR
Donald A. Fletcher, Stayton, Oreg., assignor to Farmers Co., Inc., Stayton, Oreg., a corporation of Oregon
Filed Mar. 5, 1963, Ser. No. 262,878
16 Claims. (Cl. 239—178)

This invention relates to a field irrigation apparatus and more particularly to a rotary sprinkler device having a relatively large coverage and capable of being easily moved to any desired loaction within a field.

It is therefore a primary object of the present invention to provide a mobile type of rotary sprinkler which is capable of being positioned at any desired location within a field of crop without damage thereto and also easily connected to irrigation conduits from which the source of water under pressure is derived.

Another object of the present invention is to provide a trailer type vehicle for a rotary sprinkler boom capable of providing adequate support therefor and establishing in a most facile manner fluid connections to the available source of water under pressure.

An additional object of the present invention is to provide a trailer type vehicle for a rotary sprinkler capable of being positioned at any desired location without damage to the crop.

A still further object of the present invention is to provide an efficient and economical supporting structure for a rotary sprinkler boom wherein irrigation water supply mains may be directly connected at ground level to the sprinkler apparatus from different directions so as to avoid the use of flexible hose connections without restricting the use of the sprinkler device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a partial side elevational view of the sprinkler device illustrated in FIGURE 1.

FIGURE 8 is a perspective view of another form of rotary sprinkler device constructed in accordance with the principles of the present invention.

FIGURE 9 is a partial sectional view taken substantially through a plane indicated by section line 9—9 in FIGURE 8.

FIGURE 10 is an enlarged partial sectional view taken substantially through a plane indicated by section line 10—10 in FIGURE 8.

Figure 1:
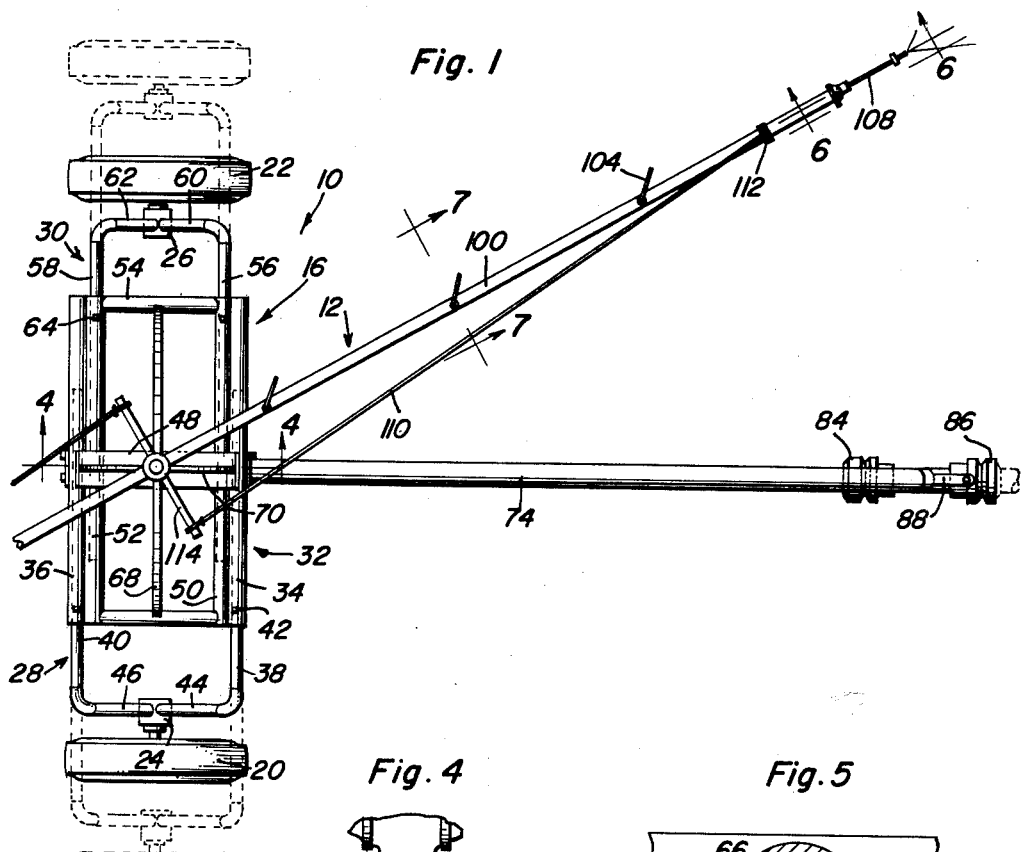
FIGURE 1 is a partial top plan view of one form of rotary sprinkler device constructed in accordance with the principles of the present invention.
Figure 2:
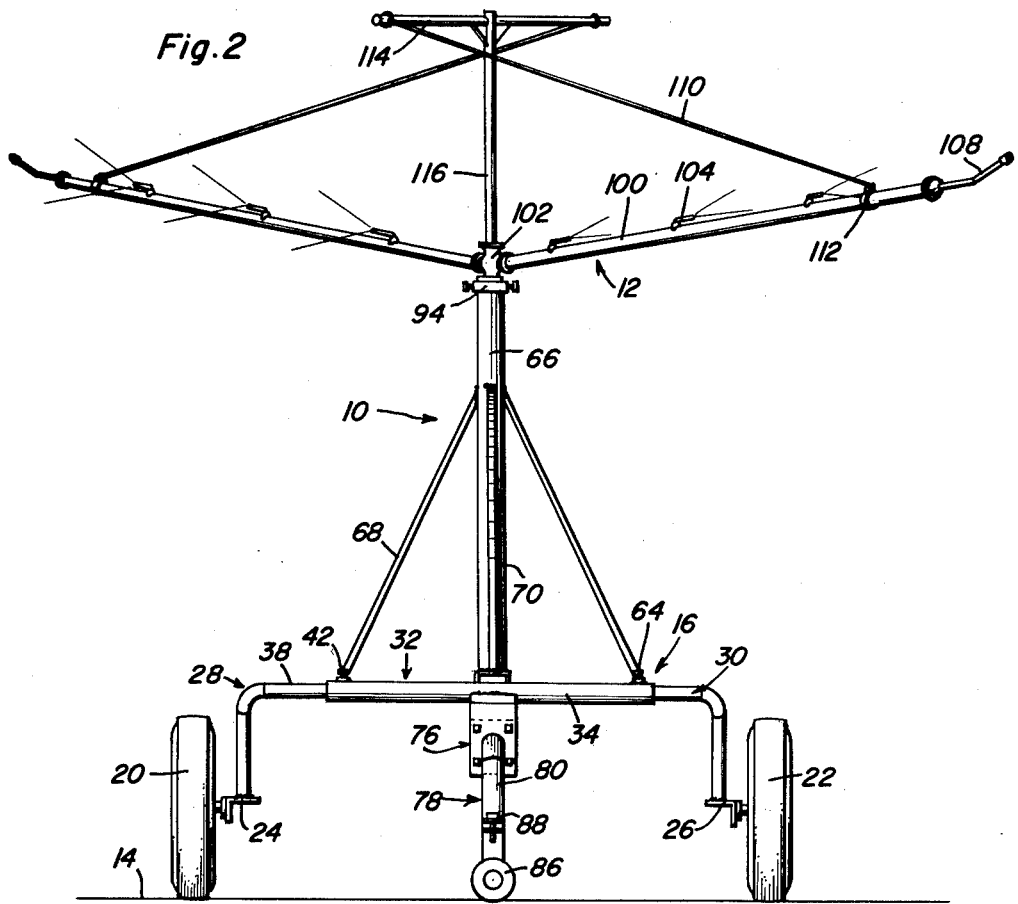
FIGURE 2 is a front elevational view of the rotary sprinkler device illustrated in FIGURE 1.

Referring now to the drawings in detail, it will be observed from FIGURES 1, 2, and 3, that one form of a rotary sprinkler device generally referred to by reference numeral 10, includes a rotary boom assembly generally referred to by reference numeral 12 which is rotatably mounted in spaced relation above the ground 14 by means of a trailer type of vehicle generally referred to by reference numeral 16. Water under pressure may accordingly be supplied to the device 10 from an irrigation supply main 18 disposed substantially at ground level, said supply main 18 being directly connected to the sprinkler device for supply of water under pressure thereto.

The trailer type vehicle 16 is provided with a pair of ground supporting wheels 20 and 22 rotatably mounted by fixed axles connected by angle brackets 24 and 26 to laterally extensible row spacing assemblies 28 and 30 which are connected to a carriage frame assembly 32 disposed in vertically spaced, crop clearing relation above the ground and between the ground supporting wheels 20 and 22. The carriage frame assembly therefore includes a forward tubular frame member 34 extending in a lateral direction with respect to the forward direction of movement of the trailer vehicle and a rear tubular frame member 36 disposed in parallel spaced relation to the tubular frame member 34. The extensible wheel supporting assembly 28 is therefore provided with a pair of parallel spaced rod members 38 and 40 slidably received within the tubular frame members 34 and 36 respectively and connected thereto in laterally adjusted positions by means of any suitable fasteners 42. Each of the rod members 38 and 40 are connected to downwardly converging rod members 44 and 46 at the lateral ends of the horizontally disposed rod members 38 and 40 whereby the laterally extensible assembly 28 is connected as by welding to the connecting angle bracket 24 to which the wheel axle is connected for the ground supporting wheel 20. Interconnecting the tubular frame members 34 and 36 midway between the lateral ends thereof is a boxed end channel support member 48. Also connected to the tubular frame members 34 and 36 and disposed alongside thereof, are a pair of parallel spaced tubular members 50 and 52. The tubular members 50 and 52 are interconnected at opposite lateral ends thereof by connecting frame members 54 so as to form a rigid carriage assembly. Slidably received within the tubular members 50 and 52 at the lateral ends opposite the extensible wheel supporting assembly 28, is the wheel supporting assembly 30 which also includes a pair of more closely spaced parallel rod members 56 and 58 interconnected with downwardly converging members 60 and 62 connected to the angle bracket 26. Accordingly, the ground supporting wheel 22 may be laterally adjusted with respect to the carriage frame assembly 16 like the ground supporting wheel 20 and held in laterally adjusted position by means of any suitable fastener assemblies 64. The carriage assembly thereby supports a tubular journal member 66 which is connected as by welding to the supporting channel member 48 and projects thereabove as more clearly seen in FIGURE 4. Rigid support for the tubular journal member on the carriage frame assembly in its vertical position, is achieved by means of a pair of strut members 68 connected at their lower ends to the connecting frame members 54 and at their upper ends to the tubular journal member 66 closer to but spaced from the upper end thereof. A second pair of strut members 70 are secured as by welding to the tubular journal member 66 and to the longitudinal ends of the channel support member 48, the strut members 70 being disposed in a plane perpendicular to the plane defined by a pair of strut members 68. Secured to the rear tubular frame member 36 and depending downwardly therefrom midway between the lateral ends thereof, is a plate member 72 to which one end of an elongated rigid conduit member 74 is connected. The conduit member 74 is also supported in spaced relation to the plate member 72 by a clamping plate assembly 76 secured to the forward tubular frame member 34 and depending therebelow. Spaced support for the elongated conduit member 74 is therefore provided in close spaced relationship below the central portion of the carriage frame assembly 16.

The elongated conduit member 74 extends forwardly from the carriage frame assembly 16 and is held in substantially horizontal position above the ground 14 by means of a ground support assembly 78. The ground support assembly 78 therefore includes a downwardly extending conduit section 80 connected to the elongated conduit member 74 at its upper end and connected at its lower end to a water inlet assembly 82. The water inlet assembly includes spaced water inlet couplings 84 and 86 adapted to be alternatively connected to an irrigation water supply main from either direction with respect to the sprinkler device 10. Also connected to the vertical conduit section 80 intermediate the upper and lower ends thereof, is a forwardly projecting trailer connecting tongue 88 whereby the trailer vehicle 16 is adapted to be hitched to a towing vehicle. Accordingly, when towed, the trailer coupling 88 will be effective to slightly raise the water inlet assembly 82 and the ground support assembly 78 above the ground for towing by the towing vehicle. When disconnected from the towing vehicle, the ground support assembly 78 will establish support for the trailer vehicle between the forward end on the ground and the ground supporting wheels in which case, the water inlet assembly 82 will be disposed at ground level for convenient connection to the irrigation water supply mains from either direction while the tubular journal member 66 disposed in perpendicular relation to the elongated conduit member 74, will be held in a substantially vertical position.

Figure 4:
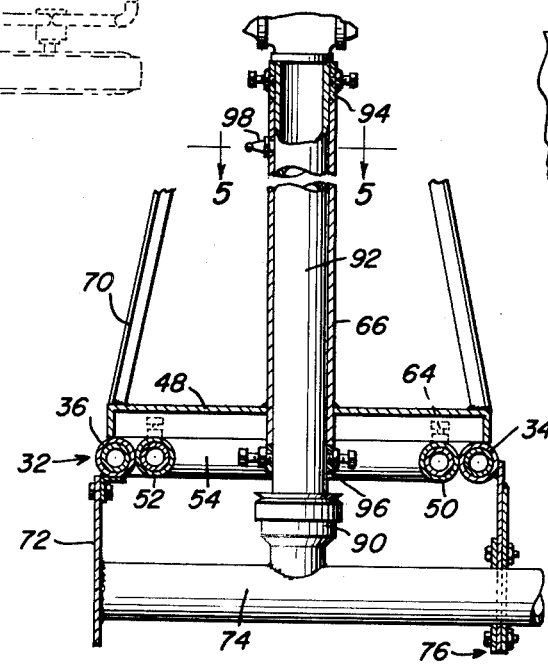
FIGURE 4 is a partial sectional view taken substantially through a plane indicated by the section line 4—4 in FIGURE 1.
Figure 5:
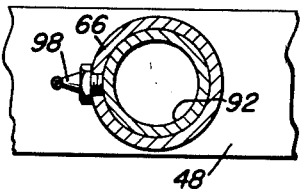
FIGURE 5 is a partial sectional view taken substantially through a plane indicated by the section line 5—5 in FIGURE 4.

As more clearly seen from FIGURE 4, the elongated conduit member 74 is connected by a coupling assembly 90 to a tubular mast section 92 rotatably supported by the tubular journal member 66 that is fixedly secured to the carriage frame assembly. Accordingly, rubber-like seal elements 94 and 96 are secured to the rotating mast section 92 in abutting relation to the axial ends of the tubular journal member 66 disposed substantially above the carriage frame assembly and slightly below the channel support member 48 for rotation with the tubular mast section. The sealing members 94 and 96 will therefore be operative to maintain lubricant within the tubular journal member 66 provided with a grease fitting 98 for such purpose. More efficient lubrication and adequate rotatable support is thereby established for the rather extensive rotary boom assembly 12 disposed above the upper end of the tubular journal member 66.

Figure 6:
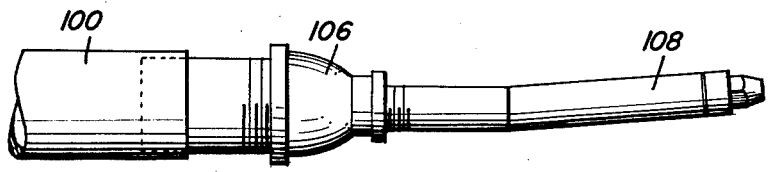
FIGURE 6 is an enlarged side elevational view of a portion of the device illustrated in FIGURE 1 as viewed from a plane indicated by the section line 6—6.
Figure 7:
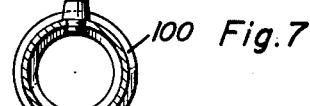
FIGURE 7 is a transverse sectional view taken substantially through a plane indicated by the section line 7—7 in FIGURE 1.

The rotary boom assembly 12 includes a pair of elongated tubular boom members 100 connected by the T-coupling 102 to the upper end of the tubular mast section 92 for rotation therewith and to receive a flow of water under pressure therefrom supplied by the elongated conduit member 74 connected by the vertical connecting conduit section 80 and the inlet assembly 82 of the ground support assembly 78 to an irrigation water supply main. Water under pressure will therefore be discharged from a plurality of spaced spray nozzles 104 secured to the tubular boom member 100 on the top thereof and inclined in one direction with respect to the longitudinal axis thereof so as to impart rotation to the boom member 100 in one direction by the reaction of the water under pressure being discharged from the nozzles 104. Also connected to the radial end of each of the boom members, by means of the coupling 106 as more clearly seen in FIGURE 6, is an end spray nozzle 108 disposed at a slight upward incline to the longitudinal axis of the boom member 100. Accordingly, water will be discharged by the spray nozzles 104 and the end nozzles 108 so as to produce a relatively large spray pattern as the boom assembly is rotated by the discharge of the water from the spray nozzles. The tubular boom members 100 are therefore maintained in a slight upward radially extending position by means of a pair of cables 110 secured by clamps 112 to radially outer portions of the boom members 100 and to the radially outer ends of a rod member 114 secured to the upper end of a mast section 116 secured to the T-coupling 102 for rotation therewith. The rod member 114 is disposed in a plane perpendicular to the plane of the boom members 100 so that the cables form a structural reinforcement for the boom members 100 necessary in view of the substantial length thereof and the accelerating forces experienced by virtue of the rotation of the rotary boom assembly 12.

From the foregoing description, the construction, operation and utility of the rotary sprinkler device 10 will be apparent. It will therefore be appreciated, that adequate rotatable support is provided for the rotating boom assembly spaced a substantial vertical distance above the ground so that a spray pattern may be discharged from the boom assembly for substantial coverage and rotation imparted thereto by virtue of the discharge of water therefrom. Also, support for the rotating boom assembly and fluid connection of the water under pressure is established by a trailer vehicle construction on supporting wheels, the lateral spacing of which may be adjusted so as to straddle crop rows without damage thereto in view of the supporting carriage assembly being vertically spaced in crop clearing relation above the ground. Also a more convenient connection is established at ground level to the irrigation supply main by ground supporting portions of the device when unhitched from the towing vehicle.

Referring now to FIGURES 8, 9, and 10, a second form of rotary sprinkler device 118 is illustrated having most of the beneficial attributes of the rotary sprinkler device 10 described with respect to FIGURES 1 through 7. The device 118 is however designed for use in connection with a field having a growing crop which is substantially higher than that for which the device 10 is designed. Accordingly, the trailer vehicle 120 for the rotary sprinkler device 118 includes laterally spaced wheel supporting assemblies 122 having downwardly converging frame members connected to the ground supporting wheels 124, the converging frame members being connected at the upper ends thereof by angle frame members 126 secured by bolt fastener assemblies 128 to angle frame members 130. The angle frame members are interconnected by transversely extending parallel spaced frame members 132 to fixedly space the wheel support assemblies 122 and are disposed a substantial distance above the ground so as to clear a relatively tall crop. In order to render the assembly more rigid, corner braces 134 are connected to the contacting ends of the horizontal frame members 132 and the downwardly converging wheel supporting frame members. Supported intermediate the lateral ends of the horizontal frame members 132, and depending therebelow, is a mast supporting assembly 136. The mast supporting assembly therefore includes an upper channel supporting member 138 to which the tubular journal member 140 is connected, the tubular journal member also being connected to a channel supporting member 142 vertically disposed in parallel relation below the channel support member 138 for spaced rigid support of the journal member 140 by the depending frame assembly 136. Accordingly, the rotatable tubular mast section 144 journaled within the journal member 140 in a manner similar to that described with respect to the device 10, is connected by the fluid coupling 146 disposed below the lower end of the journal member 140 to the elongated supply conduit 148. Spaced support is provided for the rear end portion of the elongated conduit 148 by the plate members 150 and 152 which depend from the frame assembly 136. In view of the substantial height of the elongated conduit 148 above the ground, as compared to the conduit 74 of the device 10, an upwardly inclined tubular member 154 is secured at its upper end 156 to the horizontal frame member 132 forming a ground support for the trailer vehicle 120 and a fluid connection to the elongated conduit 148. Accordingly, spaced water inlet couplings 158 and 160 are connected to the lower end of the upwardly inclined tubular member 154 at ground level for connection to a water supply main from either direction. A trailer connecting tongue 162 is also connected to the lower end of the member 154 whereby the trailer vehicle 120 may be hitched to a towing vehicle. A bracing member 164 may also interconnect the conduit 148 with the member 154 for additional support thereof. It will therefore be apparent, that when the water inlet couplings 158 and 160 are disposed at ground level for connection to a water supply and provide ground support for the forward end of the trailer vehicle, the conduit 148 will be disposed in a horizontal position so as to vertically position the tubular journal member 140 disposed perpendicular thereto for providing proper rotatable support for the rotatable boom assembly 166 similar in construction and operation to the boom assembly 12 described with respect to the device 10 in FIGURES 1 through 7. The operation, utility and advantages of the rotary sprinkler device 118 is therefore similar to that of the sprinkler device 10 hereinbefore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. In a field irrigation device having a rotatable sprinkler boom; a trailer type vehicle adapted to be towed by a towing vehicle comprising, laterally spaced ground supporting wheels, carriage means operatively connected to said wheels and vertically spaced thereabove in crop clearing relation to the ground between said wheels, a tubular mast rotatably supported by said carriage means and projecting thereabove for supporting and establishing a fluid connection to said sprinkler boom, elongated rigid conduit means operatively connected to said carriage means and extending forwardly therefrom for supply of fluid under pressure to the tubular mast, ground support means connected to a forward end of said elongated conduit means remote from the carriage means for positioning the tubular mast in a substantially vertical position above the ground, inlet coupling means mounted substantially at ground level on said ground support means for direct connection to irrigation pipes, and trailer coupling means mounted on the ground support means for connection to said towing vehicle.

2. The combination of claim 1, wherein said inlet coupling means includes spaced inlet fittings connected to the ground support means for supply of fluid to the conduit means from different directions substantially at ground level.

3. The combination of claim 2, including elongated journal means fixedly mounted on the carriage means for rotatably mounting said tubular mast below the sprinkler boom, and spaced seal means connected to said tubular mast at opposite ends of said journal means for lubrication therewithin, a lower end of the journal means being in close spaced relation to the elongated conduit means for fluid connection of the tubular mast thereto.

4. The combination of claim 3, wherein said ground support means comprises, a vertical connecting section having a lower end connected to said inlet coupling means, and an upper end connected to the elongated conduit means for support thereof in a substantially horizontal position, said trailer coupling means being secured to the vertical connecting section intermediate said ends thereof.

5. The combination of claim 1, including elongated journal means fixedly mounted on the carriage means for rotatably mounting said tubular mast below the sprinkler boom, and spaced seal means connected to said tubular mast at opposite ends of said journal means for lubrication therewithin, a lower end of the journal means being in close spaced relation to the elongated conduit means for fluid connection of the tubular mast thereto.

6. The combination of claim 5, wherein said ground support means comprises, an upwardly inclined member connected at an upper end to the carriage means in vertically spaced relation above the elongated conduit means, said inlet coupling means being connected to a lower end of said inclined member substantially at ground level.

7. The combination of claim 1, wherein said ground support means comprises, an upwardly inclined member connected at an upper end to the carriage means in vertically spaced relation above the elongated conduit means, said inlet coupling means being connected to a lower end of said inclined member substantially at ground level.

8. The combination of claim 7, wherein said inlet coupling means includes spaced inlet fittings connected to the ground support means for supply of fluid to the conduit means from different directions substantially at ground level.

9. The combination of claim 1, wherein said ground support means comprises, a vertical connecting section having a lower end connected to said inlet coupling means, and an upper end connected to the elongated conduit means for support thereof in a substantially horizontal position, said trailer coupling means being secured to the vertical connecting section intermediate said ends thereof.

10. The combination of claim 9, wherein said inlet coupling means includes spaced inlet fittings connected to the ground support means for supply of fluid to the conduit means from different directions substantially at ground level.

11. In a field irrigation device having a rotatable sprinkler boom; a trailer type vehicle adapted to be towed by a towing vehicle comprising, laterally spaced ground supporting wheels, carriage means operatively connected to said wheels, a tubular mast rotatably supported by said carriage means and projecting thereabove for supporting and establishing a fluid connection to said sprinkler boom, elongated rigid conduit means operatively connected to said carriage means and extending forwardly therefrom in perpendicular relation to the tubular mast, ground support means connected to a forward end of said elongated conduit means remote from the carriage means for positioning the tubular mast in a substantially vertical position above the ground, inlet coupling means mounted substantially at ground level on said ground support means for direct connection to irrigation pipes.

12. The combination of claim 11, wherein said inlet coupling means includes spaced inlet fittings connected to the ground support means for supply of fluid to the conduit means from different directions substantially at ground level.

13. In a field irrigation device having a rotatable sprinkler boom; a trailer type vehicle adapted to be towed by a towing vehicle comprising, laterally spaced ground supporting wheels, carriage means operatively connected to said wheels and vertically spaced thereabove in crop clearing relation to the ground between said wheels, a tubular mast rotatably supported by said carriage means and projecting thereabove for supporting and establishing a fluid connection to said springler boom, elongated rigid conduit means operatively connected to said carriage means and extending forwardly therefrom for supply of fluid under pressure to the tubular mast, ground support means connected to a forward end of said elongated conduit means remote from the carriage means for positioning the tubular mast in a substantially vertical position above the ground, and trailer coupling means mounted on the ground support means for connection to said towing vehicle.

14. The combination of claim 13, including elongated journal means fixedly mounted on the carriage means for rotatably mounting said tubular mast below the sprinkler boom, and spaced seal means connected to said tubular mast at opposite ends of said journal means for lubrication therewithin, a lower end of the journal means being in close spaced relation to the elongated conduit means for fluid connection of the tubular mast thereto.

15. The combination of claim 14, including means adjustably spacing said ground supporting wheels for straddling rows of crops below the carriage means.

16. The combination of claim 1, including means adjustably spacing said ground supporting wheels for straddling rows of crops below the carriage means.

References Cited in the file of this patent

UNITED STATES PATENTS

| | | |
|---|---|---|
| 1,171,068 | Schienke | Feb. 8, 1916 |
| 2,293,796 | Bestor | Aug. 25, 1942 |
| 2,964,247 | Maasdam | Dec. 13, 1960 |
| 2,988,287 | Sherman | June 13, 1961 |

FOREIGN PATENTS

| | | |
|---|---|---|
| 294,962 | Switzerland | Feb. 16, 1954 |
| 839,561 | France | Jan. 4, 1939 |